United States Patent [19]

Kubota

[11] 3,969,311

[45] July 13, 1976

[54] FIBER REINFORCED POLYESTER RESIN HAVING A LOW SURFACE PROFILE

[75] Inventor: Hideo Kubota, Sterling Heights, Mich.

[73] Assignee: General Motors Corporation, Detroit, Mich.

[22] Filed: Apr. 3, 1975

[21] Appl. No.: 564,713

[52] U.S. Cl. .............................. 260/40 R; 260/861
[51] Int. Cl.² ......................................... C08L 67/06
[58] Field of Search ........................ 260/40 R, 861

[56] References Cited
UNITED STATES PATENTS

| | | | |
|---|---|---|---|
| 3,814,718 | 6/1974 | Busch et al. ...................... | 260/40 R |
| 3,814,724 | 6/1974 | Suzuki et al. .................... | 260/861 X |
| 3,819,760 | 6/1974 | Aito et al. ........................ | 260/861 |

Primary Examiner—Lewis T. Jacobs
Assistant Examiner—S. M. Person
Attorney, Agent, or Firm—George A. Grove

[57] ABSTRACT

In accordance with a preferred embodiment of this invention, a fiber reinforced polyester article having a low surface profile is produced from a material which may be used either as a bulk molding or as a sheet molding compound. Preferably, this composition is produced from a formulation comprising about equal proportions of (1) an unsaturated polyester condensation product dissolved in (2) a copolymerizable reactive diluent solution of from proportionally 1½ to 2 parts by weight of tertiary butyl styrene per each part of styrene. This formulation will of course also contain a filler such as a particulate calcium carbonate and reinforcing glass fibers. It is the specific combination of styrene and tertiary butyl styrene which promotes the low profile surface in the final molded article.

4 Claims, No Drawings

FIBER REINFORCED POLYESTER RESIN HAVING A LOW SURFACE PROFILE

FIELD OF THE INVENTION

This invention relates to a low profile polyester resin composition suitable for both bulk molding and sheet molding applications.

BACKGROUND OF THE INVENTION

For many years, articles molded from fiber reinforced thermosetting polyester resins have been widely used. Typically, these articles are formed by heating under pressure a uniformly dispersed blend of a mixture of filling, reinforcing and process aiding ingredients and a mixture of matrix forming ingredients such as an unsaturated polyester dissolved of dispersed in a monomeric diluent. The formability and low cost of these resins have made them attractive in many nondecorative applications. However, their characteristically rough surface has prevented their use in decorative applications, and particularly in applications where it is desirable to have painted surfaces. This surface problem is caused by the relatively large shrinkage of the polyester matrix during the curing operation as compared with the shrinkage of the reinforcing glass fibers; the matrix simply shrinks away from the fibers leaving them protruding from the surface. To date, it has been necessary to either polish this surface or to add a rigid thermoplastic material to the composition to produce a low profile polyester composition as disclosed in U.S. Pat. Nos. 3,642,672, 3,701,748, and 3,711,432 and my application Ser. No. 424,574, now U.S. Pat. No. 3,882,078. It is believed that the thermoplastic material interferes with the shrinkage of the polyester matrix, and thereby prevents the formation of the rough surface. However, the addition of the thermoplastic resin adds to the cost of the material and also presents problems during the mixing and thickening steps in the preparation of the formulation.

OBJECTS OF THE INVENTION

It is an object of this invention to provide a filled and fiber reinforced molded polyester article, having a low profile surface, by heating under pressure a homogeneous blend of 1) a mixture of typical filling, reinforcing and process aiding ingredients and 2) a solution of an unsaturated polyester dissolved in a monomeric reactive diluent solution which is proportionally from one to two parts of tertiary butyl styrene to one part styrene, wherein the low profile surface of the article is achieved without the use of rigid thermoplastic additives.

It is a further object of this invention to provide an article having a low profile surface from a thermosetting, filled and fiber reinforced polyester composition formed from a reactive mixture in which the cross-linking diluent is a solution of from proportionally about 1 1/2 to 2 parts of tertiary butyl styrene to one part styrene and wherein the low profile surface is provided by this specific diluent composition.

It is a further object to provide a fiber reinforced thermosetting polyester article wherein the specific diluent composition contributes a low surface profile to the article which surface may be directly painted without specific low profile additives or additional finishing operations.

SUMMARY OF THE INVENTION

In accordance with the preferred embodiment of my invention, these and other objects are accomplished by heating and curing under pressure a uniformly dispersed blend of a mixture of filling reinforcing and process aiding ingredients and a solution of a linear aliphatic unsaturated polyester dissolved in a monomeric reactive diluent of proportionally about 1 1/2 to 2 parts by weight of tertiary butyl styrene for each part by weight of styrene. Ths polyester and the diluent are present in about equal amounts. In the subject composition, the specific monemeric diluent promotes the formation of the low profile surface. Preferably, for each 50 parts by weight of the polyester there is from 145 to 250 parts by weight of a mineral filler such as calcium carbonate and from 90 to 130 parts by weight of a glass fiber having an average fiber length of about one inch. At this point, it is to be noted that as the amount of the mineral filler increases, the surface properties of articles molded from the composition improve, however, at the cost of a reduction in impact strength. Conversely, as the amount of glass fibers increases, the surface problems increase accordingly. From an economic point of view, it is preferable to use as much of the mineral filler as possible as this is the lowest cost item.

The key to achieving the low profile surface with neither a separate finishing operation nor a rigid thermoplastic additive is in the selection of the subject monomeric diluent composition. By using this unexpected technique to produce the low profile surface it is possible to achieve several other advantages over those compositions which employ the thermoplastic additive. First, it is possible to eliminate the mixing problems encountered with the use of the rigid thermoplastic low profile surface additive. It is necessary during this process to maintain a uniformly dispersed blend of all ingredients and special steps must be taken when a thermoplastic material is used, as it tends to form a separate phase. Second, it is much easier to compound the subject solution with fillers, as the subject solution more readily wets these materials. This advantage is the result of the low viscosity and homogeneous properties of the solution. Third, it is possible to achieve higher concentrations of fillers because of the uniformity and homogeneity of the subject solution. Fourth, since the subject composition contains no thermoplastic materials, there is nothing to hinder the thickening process. Furthermore, since the subject solution is more uniform and homogeneous, articles molded therefrom have a more uniform crosslink density which prevents the formation of weak spots and stress risers.

These and other advantages of my invention may be more easily understood in view of a detailed description thereof to include specific examples.

DETAILED DESCRIPTION OF THE INVENTION

In accordance with the practice of this invention, a mineral filled and fiber reinforced thermosetting polyester molding composition is heated under pressure to form a molded article. The selection of the reactive diluent components in combination with the other ingredients provides a low profile surface which may be directly painted with no intervening finishing steps. To date, the only other technique of achieving this desired low profile surface was to add a rigid thermoplastic material such as cellulose acetate butyrate or an acrylic resin to the composition. It has been found that by using a diluent containing tertiary butyl styrene and styrene in proportions from about one to two parts of tertiary butyl styrene for each part of styrene it is possible to achieve the low profile surface without the added cost of a thermoplastic additive and without the rather severe loss in impact strength that accompanies the use of the thermoplastic additive.

One of the matrix forming ingredients in the subject composition is a polyester condensation reaction product of an ethylenically alpha, beta-unsaturated linear aliphatic dicarboxylic acid and/or anhydride having from four to six carbon atoms and linear polyhydric alcohols. The acid number of the polyester reaction product may vary from 5 to 40. For example, the condensation product of maleic and/or fumaric acid and poly (propylene glycol) has performed satisfactorily and proved to be compatible with all variations of the basic systems disclosed herein.

Another of the matrix forming ingredients is the monomeric reactive diluent which serves two purposes. First, it provides a liquid medium into which all other ingredients may be either dissolved or dispersed and thereby form a relatively homogeneous and uniform blend which can be handled for some time after blending without the danger of one or more of the components forming a separate phase. Second, the diluent functions as a cross-linking agent durnng the curing process and thereby sets up the characteristic three dimensional matrix of a thermosetting system. In performing this second function, the diluent literally is copolymerized and therefore it must contain at least one point of ethylenic unsaturation. In the subject formulation the diluent, in some fashion, is able to alter the shrinkage characteristics of the composition as it cures in such a manner to prevent a roughened surface from forming. The exact mechanism by which this low profile surface is achieved is not fully understood. However, it is apparent that it is an unexpected synergistic effect between the diluent components, tertiary butyl styrene and styrene, when used in the specified proportions. Experiments have shown that compositions employing diluents consisting of either 100% tertiary butyl styrene or 100% styrene are incapable of promoting a low profile surface. On the other hand, the desired low profile surface can be achieved if the relative proportions of tertiary butyl styrene and styrene are controlled within the specific limits. Preferably, these limits are that there be from 1 ½ to 2 parts by weight of tertiary butyl styrene for each part by weight of styrene.

It is to be noted that this novel formulation may contain any of the conventional filling, reinforcing and process aiding additives, typically used in polyester molding compositions. For example, for each 50 parts of the polyester resin by weight the composition may include from about 145 to about 250 parts by weight of a mineral filler such as calcium carbonate, from about 90 to about 130 parts by weight of a glass fiber; from about one to about two parts by weight of a cross-linking initiator such as tertiary butyl perbenzoate, from about 1 to about 3 parts by weight of a thickener such as magnesium oxide (MgO) and from about 2 to about 5 parts by weight of a lubricant such as zinc stearate. The ease with which the subject formulation accepts these additives makes it readily adaptable to conventional processing techniques and equipment.

An important criterion for selecting appropriate components for the subject molding composition is the need for a liquid "solution" during the compounding or blending steps. It is obvious to those skilled in the art that the use of the term solution in this context does not denote a true chemical solution but instead describes a rather homogeneous liquid dispersion which does not separate into multiple phases during the compounding and blending operations. If such a mixture were allowed to stand for a significant period of time, such a separation would probably occur. However, this delayed separation is of little concern to those utilizing the subject formulation since the molding operations are conventionally done within a short period of time after blending and all that is required is a relatively homogeneous mixture during these operations. However, it is to be noted that with the use of the subject diluent, the polyester does indeed dissolve in the diluent and produces a homogeneous polyester solution which then readily accepts a dispersion of the other ingredients to produce a uniform homogeneous solution which is easily handled and has a relatively long shelf life.

EXAMPLE I

Four hundred grams of poly (dipropylene glycol fumarate-co-maleate were dissolved in about 400 grams of a mixture containing proportionally by weight about 1.67 parts of tertiary butyl styrene for each part of styrene. This produced a homogeneous solution with a relatively low viscosity. The molecular weight of the poly (dipropylene glycol fumarate-co-maleate) was about 2,600 and its acid number was 25. This solution was termed resin $Z_1$.

A formulation was then compounded containing 100 parts by weight of resin $Z_1$, 150 parts by weight of calcium carbonate, 98 parts by weight of a glass fiber having an average length of one inch, 2 parts by weight of zinc stearate, 1.3 parts by weight of tertiary butyl perbenzoate and 5 parts by weight of a thickener termed Multifier M which was marketed by Marco Chemical Division of Grace Chemical Company. After thickening for 48 hours at room temperature, this bulk molding compound was compression molded at 300° F. (mold temperature) and 950 psi (molding pressure) for two minutes. The molded article had a flexural modulus of $1.7 \times 10^6$ psi, a flexural strength of 19,000 psi and a notched izod impact strength of 10 foot pounds per inch and unnotched izod impact strength of 15 pounds per inch. The surfaces of the article were smooth and no glass fiber pattern was visible despite the high concentration of glass fibers. Without any surface finishing operation, this article was satisfactorily painted with a body primer and an acrylic lacquer.

EXAMPLE II

Using resin $Z_1$ from Example I and the methods described in Example I, a bulk molding composition was formulated which contained 100 parts per weight of resin $Z_1$, 200 parts per weight of calcium carbonate, 118 parts per weight of glass fibers, 4.5 parts by weight of the thickener (Multifier M), 2.6 parts by weight of zinc stearate and 1.3 parts by weight of tertiary butyl perbenzoate. After thickening 48 hours at room temperature, this bulk molding composition was compression molded at 300° F. (mold temperature) at 1,050 psi (mold pressure) for 2 minutes. The resulted article had a flexural modulus of $1.65 \times 10^6$ psi, a flexural strength of 22,000 psi and a notched impact strength of 7.5 pounds per inch and an unnotched impact strength of 8.5 pounds per inch. The surface of the samples molded from this composition was smooth and easily painted with the same coating system described in Example I.

EXAMPLE III

Four hundred grams of poly (dipropylene glycol fumarate-co-maleate) were dissolved in 400 grams of a diluent mixture containing equal parts of tertiary butyl styrene and styrene. This polyester solution was termed resin $Z_2$ and a molding composition was formulated containing: 100 parts by weight of resin $Z_2$, 150 parts by weight of calcium carbonate, 98 parts by weight of glass fiber, 5 parts by weight of the thickener Multifier M, 2 parts by weight of zinc stearate, and 1.3 parts of tertiary butyl perbenzoate. After thickening for 50 hours at room temperature, this composition was compression molded at 300° F. (mold temperature) at 950 psi (mold pressure) for two minutes. The article molded from this composition had the following mechanical properties: a flexural strength of $1.6 \times 10^6$ psi, a flexural strength of 20,000 psi and a notched izod impact strength of 8 foot pounds per inch. The surfaces of this article were smooth and readily painted with the same coating system as that described in Example I.

EXAMPLE IV

A molding composition was formulated containing 100 parts by weight of resin $Z_2$, 200 parts by weight of calcium carbonate, 128 parts by weight of glass fiber, 4.5 parts by weight of the thickener Multifier M, 2.6 parts by weight of zinc stearate, and 1.3 parts by weight of tertiary butyl perbenzoate. After thickening for 48 hours at room temperature, this composition was compression molded at 300° F. (mold temperature) and 1,050 psi (mold pressure) for two minutes. The resulting article has the following mechanical properties: (1) a flexural modulus of $1.6 \times 10^6$ psi, (2) a flexural strength of 22,000 psi and a notched izod impact strength of 7.5 foot pounds per inch. The surfaces of this article were smooth and satisfactorily painted with the coating system described in Example I.

EXAMPLE V

A molding composition was formulated containing 100 parts by weight of resin $Z_2$, 133 parts by weight of calcium carbonate, 91 parts by weight of glass fiber, 5 parts by weight of the thickener Multifier M, 1.8 parts by weight of zinc stearate, 1.3 parts by weight of tertiary butyl perbenzoate. After thickening for 48 hours at room temperature, the composition was compression molded at 300° F. (mold temperature) and 950 psi (mold pressure) for two minutes. Although the article had physical properties which were comparable to that of the article molded in accordance with Example III, the surface of this article was rough and would not produce a suitably smooth painted surface. It is believed that the reduced amount of calcium carbonate caused this surface problem.

EXAMPLE VI

Three hundred grams of poly (dipropylene glycol fumarate-co-maleate) were dissolved in about 300 grams of a mixture of proportionally 2 parts by weight of tertiary butyl styrene and 1 part by weight of styrene. Three hundred grams of this polyester solution were mixed with 100 grams of a commercial low profile thermosetting polyester resin, marketed by the Grace Chemical Company under the trade name GR-13024. This mixture was termed resin $Z_3$.

A molding formulation was then prepared containing 100 parts by weight of resin $Z_3$, 200 parts by weight of calcium carbonate, 119 parts of glass fiber, 4 parts of the thickener Multifier M, 2.6 parts by weight of zinc stearate, and 1.3 parts by weight of tertiary butyl perbenzoate. After thickening for 48 hours at room temperature, this molding was compression molded at 300° F. (mold temperature) and 1,050 psi (mold pressure) for three minutes. The article produced in this manner has a flexural modulus of $2 \times 10^6$ psi, a flexural strength of 20,500 psi and a notched izod impact strength of 7 foot pounds per inch. The surfaces of the sample were smooth and readily painted with a thin coating system described in Example I. This example demonstrates that the subject molding composition is compatible with other thermosetting compositions which may be used to modify the properties of the subject composition.

While my invention has been described in terms of certain preferred embodiments, it will be appreciated that other forms thereof could readily be adapted by one skilled in the art. Therefore, the scope of my invention should not be limited to the specific embodiments illustrated herein.

What is claimed is:

1. A fiber reinforced molded article, having a low profile surface, which article is formed by heating under pressure a uniformly dispersed blend consisting essentially of:

filling, reinforcing, and process aiding ingredients comprising by weight:
   a. from about 90 to about 130 parts of a fibrous reinforcing filler;
   b. from about 145 to about 250 parts of a mineral filler; and matrix forming ingredients consisting essentially of by weight:
   c. about 50 parts of an unsaturated polyester formed from a linear aliphatic alpha, beta-unsaturated dicarboxyliic acid and/or anhydride having from 4 to 6 carbon atoms and a polyhydric alcohol, said polyester having an acid number of from 5 to 40; and
   d. 40 to 60 parts of a monomeric copolymerizable diluent solution comprising proportionally about 1 part by weight of styrene and from about 1 to 2 parts by weight of tertiary butyl styrene.

2. A fiber reinforced molded article, having a low profile surface, which article is formed by heating under pressure a uniformly dispersed blend consisting essentially of:

filling, reinforcing, and process aiding ingredients comprising by weight:
   a. from about 90 to about 130 parts of a fibrous reinforcing filler;
   b. from about 145 to about 250 parts of a mineral filler; and matrix forming ingredients consisting essentially of by weight:
   c. about 50 parts of an unsaturated polyester formed from a linear aliphatic alpha, beta-unsaturated dicarboxylic acid and/or anhydride having from 4 to 6 carbon atoms and a polyhydric alcohol, said polyester having an acid number of from 5 to 40; and d. 40 to 60 parts of a monomeric copolymerizable diluent solution comprising proportionally about 1 part by weight of styrene and from about 1½ to 2 parts by weight of tertiary butyl styrene.

3. A low profile fiber reinforced molded article formed by heating under pressure a mixture consisting essentially of by weight:

A. about 50 parts of an unsaturated polyester formed from a linear aliphatic alpha, beta-unsaturated dicarboxylic acid and/or anhydride having from 4 to 6 carbon atoms and a polyhydric alcohol, said polyester having an acid number of from 5 to 40; and B. about 40 to about 60 parts of a monomeric copolymerizable diluent solution comprising proportionally about 1 part by weight of styrene and from about 1 to 2 parts by weight of tertiary butyl styrene; and C. about 90 to about 130 parts of a fibrous reinforcing filler; and D. about 145 to about 250 parts of a mineral filler, said polyester, said fiber filler and said mineral filler being initially uniformly dispersed in said diluent.

4. A low profile fiber reinforced molded article formed by heating under pressure a mixture consisting essentially of by weight:

A. about 50 parts of an unsaturated polyester formed from a linear aliphatic alpha, beta-unsaturated dicarboxylic acid and/or anhydride having from 4 to 6 carbon atoms and a polyhydric alcohol, said polyester having an acid number of from 5 to 40; and B. about 40 to about 60 parts of a monomeric copolymerizable diluent solution comprising proportionally about 1 part by weight of styrene and from about 1 ½ to 2 parts by weight of tertiary butyl styrene; and C. about 90 to about 130 parts of a fibrous reinforcing filler; and D. about 145 to about 250 parts of a mineral filler, said polyester, said fiber filler and said mineral filler being initially uniformly dispersed in said diluent.

* * * * *